United States Patent
Sakai et al.

(10) Patent No.: US 6,172,158 B1
(45) Date of Patent: Jan. 9, 2001

(54) VINYLIDENE CHLORIDE-BASED LATEX AND PROCESS FOR PRODUCING THE SAME

(75) Inventors: Hideki Sakai; Yukio Yamawaki; Masahisa Yokota, all of Miyazaki (JP)

(73) Assignee: Asahi Kasei Kogyo Kabushiki Kaisha, Osaka (JP)

( * ) Notice: Under 35 U.S.C. 154(b), the term of this patent shall be extended for 0 days.

(21) Appl. No.: 09/421,522

(22) Filed: Oct. 20, 1999

Related U.S. Application Data (63) Continuation of application No. PCT/JP97/03855, filed on Oct. 23, 1997.

(30) Foreign Application Priority Data

Apr. 25, 1997 (JP) .................................... 9-121467

(51) Int. Cl.⁷ ................ C08L 27/08; C08J 3/05
(52) U.S. Cl. .......................... 524/568; 528/491; 528/501
(58) Field of Search ..................... 528/491, 501; 524/568

(56) References Cited

U.S. PATENT DOCUMENTS 4,229,569 * 10/1980 Feldman et al. .................... 528/501
4,233,437 * 11/1980 Kalka et al. ........................ 528/501
4,315,843 * 2/1982 Vidotto et al. .

FOREIGN PATENT DOCUMENTS

| | | |
|---|---|---|
| 39-24114 | 10/1938 | (JP) . |
| 48-10941 * | 2/1973 | (JP) . |
| 57-57741 | 4/1982 | (JP) . |
| 57-076044 | 12/1982 | (JP) . |
| 59-209644 | 11/1984 | (JP) . |
| 62-30162 | 2/1987 | (JP) . |
| 2-151610 | 6/1990 | (JP) . |
| 3-70714 | 3/1991 | (JP) . |
| 3-97704 | 4/1991 | (JP) . |

* cited by examiner

*Primary Examiner*—Tae Yoon
(74) *Attorney, Agent, or Firm*—Birch, Stewart, Kolasch & Birch, LLP (57) ABSTRACT

The vinylidene chloride-based latex of the invention has a chlorine ion content reduced to or below 500 ppm based on the total concentration of all solid matter in the latex by weight, preferably by dialysis, and has excellent resistance to hot water treatment.

17 Claims, 3 Drawing Sheets

# VINYLIDENE CHLORIDE-BASED LATEX AND PROCESS FOR PRODUCING THE SAME

This application is a continuation of PCT/JP97/03855 filed Oct. 23, 1997.

TECHNICAL FIELD

The present invention relates to a vinylidene chloride-based latex capable of forming a coating film which not only has satisfactory adhesion and satisfactory printability but has excellent gas (especially oxygen) and water vapor barrier properties and excellent resistance to hot water treatment. This invention further relates to a process for producing the latex.

BACKGROUND ART

Vinylidene chloride-based latexes have an important use in that the latexes are applied to films of plastics, e.g., polypropylene, polyesters, and nylons, directly or after application of an anchor coat to thereby greatly improve the gas and water vapor barrier properties of the plastic films.

These latexes are required to form a coating film having satisfactory adhesion to base films. Although the coating film formed must be satisfactory in other properties, including printability and suitability for laminating to other films, the most strongly required property of the coating film formed is excellent gas and water vapor barrier properties.

Such a coating film is used mainly for food packaging. Depending on the kinds of foods, the packages should be immersed in hot water to sterilize the contents after packaging. In this case, the hot water treatment may impair the transparency of the coating film to make the same milky (hereinafter referred to as "boil blushing") or reduce the gas barrier properties of the coating film. There is hence a desire for a latex capable of forming a coating film which suffers from neither boil blushing nor a decrease in gas barrier properties through hot water treatment and also has excellent hot-water resistance.

For example, an examined Japanese patent publication 48-10941 discloses a technique for obtaining a latex which forms a coating film excellent in both gas barrier properties after hot water treatment and also in other properties. The technique comprises dialyzing a vinylidene chloride-based latex with a diaphragm to reduce the total content of inorganic salts to 0.5% to 0.1% to thereby produce the desired latex.

However, the example given in the above reference is insufficient in improving coating films in boil blushing.

An important requirement for food-packaging materials is to maintain the aesthetic appearance of articles. In particular, since boil blushing of a coating film significantly impairs the commercial value of the article, it is essential in the field of food packaging to use a technique for preventing the blushing. In addition, the performance required in the food-packaging market has become increasingly high in recent years, and a further improvement is necessary for markedly improving resistance to hot water.

An object of the present invention is to provide a vinylidene chloride-based latex which gives a coating film having satisfactory resistance to hot water without the disadvantages of prior art latexes, and to provide a process for producing the vinylidene chloride-based latex. More particularly, the object of the present invention is to provide a vinylidene chloride-based latex capable of providing a coating film which undergoes neither boil blushing nor a decrease in gas barrier properties through hot water treatment, and to provide a simple and efficient process for industrially producing the latex.

DISCLOSURE OF THE INVENTION

With respect to the vinylidene chloride-based latex, the copolymer produced generates hydrochloric acid during the polymerization. The latex obtained usually contains chlorine ions in an amount of about 1,000 ppm of the copolymer.

The present inventors made intensive investigations in order to eliminate the problem of the prior art technique. As a result, it was surprisingly found that a coating film formed by applying the latex having significantly improved resistance to hot water, in particular resistance to boil blushing, can be obtained by dialyzing a latex to reduce the content of chlorine ions contained therein to or below a given amount. The present invention has been completed based on this finding.

The present invention provides a vinylidene chloride-based latex which has a chlorine ion content reduced to or below 500 ppm, preferably 200 ppm of all solid matter in the latex by weight, as well as a process for producing the latex.

The present invention will be explained below in detail.

The vinylidene chloride-based latex used for the present invention is a copolymer latex obtained by the emulsion polymerization of a monomer mixture containing vinylidene chloride as the main monomer. The copolymer has a vinylidene chloride content of 50% by weight or higher. For applications where an especially high degree of gas and water vapor barrier properties are required, the vinylidene chloride content in the latex is preferably from 86 to 94% by weight.

If the vinylidene chloride content in the latex is lower than 86% by weight, the copolymer has reduced crystallinity and the latex forms a coating film having impaired gas and water vapor barrier properties. If the content thereof exceeds 94% by weight, the copolymer crystallizes immediately after polymerization, and the latex particles become too rigid resulting in insufficient film-forming properties.

There are no particular limitations on the kinds of emulsifying agents, polymerization initiators, surfactants, and the like that can be used in producing the vinylidene chloride-based latex through emulsion polymerization.

Comonomer ingredients usable for producing the vinylidene chloride-based latex used for the present invention are monomers copolymerizable with vinylidene chloride. Examples thereof include:

(a) (meth)acrylic esters such as alkyl or cycloalkyl (meth) acrylates in which the alkyl or cycloalkyl has 1 to 18 carbon atoms (e.g., methyl (meth)acrylate, ethyl (meth) acrylate, propyl (meth)acrylate, n-butyl (meth)acrylate, isobutyl (meth)acrylate, tert-butyl (meth)acrylate, 2-ethylhexyl (meth)acrylate, glycidyl (meth)acrylate, cyclohexyl (meth)acrylate, n-octyl (meth)acrylate, lauryl (meth)acrylate, tridecyl (meth)acrylate, and stearyl (meth) acrylate) and alkoxyalkyl (meth)acrylates in which the alkoxyalkyl has 2 to 18 carbon atoms (e.g., methoxybutyl (meth)acrylate, methoxyethyl (meth)acrylate, and ethoxybutyl (meth)acrylate);

(b) ethylenic α,β-unsaturated carboxylic acids having carboxyl group(s), such as (meth)acrylic acid, crotonic acid, itaconic acid, itaconic anhydride, maleic acid, maleic anhydride, fumaric acid, and citraconic acid, and salts of these acids;

(c) unsaturated amide compounds such as (meth)acrylamide and diacetone acrylamide;

(d) monomers containing a nitrile group, such as acrylonitrile and methacrylonitrile;
(e) hydroxyalkyl (meth)acrylates in which the hydroxyalkyl has 2 to 8 carbon atoms, such as 2-hydroxyethyl (meth)acrylate, 2-hydroxypropyl (meth)acrylate, 3-hydroxypropyl (meth)acrylate, and hydroxybutyl (meth)acrylate, polyoxyethylene monoacrylate, polyoxyethylene monomethacrylate, and hydroxyl-containing monomers such as N-methylol(meth)acrylamide and allyl alcohol; and
(f) other polymerizable unsaturated monomers such as styrene, α-methylstyrene, vinyl chloride, butadiene, vinyltoluene, and vinyl acetate.

Methods for removing impurities including inorganic salts from such a vinylidene chloride-based latex include the adsorption method using an ion-exchange resin, the membrane filtration method using a microfiltration membrane or ultrafiltration membrane, and the dialysis method using a semipermeable membrane.

The method of adsorption with an ion-exchange resin was found to be difficult to use industrially because vinylidene chloride-based latex particles are adsorbed onto the anion-exchange resin due to the negative charge of the latex particles themselves, and because neutral molecules cannot be removed, and regeneration of the ion-exchange resin requires a long period of time.

The membrane filtration method was found to be extremely difficult to industrially apply to a vinylidene chloride-based latex because it has a disadvantage that the latex is apt to form a deposit layer on the membrane surface during the filtration treatment, and the membrane having the deposit layer cannot be completely restored to its original state even through a treatment such as back washing. Consequently, the rate of removal and the rate of water permeation decrease with the lapse of time.

As a result of intensive investigations made by the present inventors, they have found that dialysis with a semipermeable membrane is the most efficient method for obtaining the latex of the present invention.

Examples of the semipermeable membrane used for carrying out the present invention include membranes usually used for dialysis, such as membranes of cellulose-based (e.g., regenerated cellulose, cellulose acetate-based, and chemically modified celluloses)-based, polyacrylonitrile-based, poly(methyl methacrylate)-based, polysulfones-based, poly(ethylene-vinyl alcohol)s-based, and polyamides-based, and membranes used for filtration, such as membranes of polyacrylonitrile-based, polysulfones-based, polyethersulfones-based, poly(vinylidene fluoride)-based, cellulose acetate-based, polyolefins-based (e.g., polyethylene and polypropylene), polyamides-based, and polyimides-based. Such semipermeable membranes are used in various forms including hollow fiber, flat sheet, spiral, and tube.

The present inventors have found that dialysis with a hollow-fiber membrane module among those is the most effective in achieving the objects of the present invention and is especially superior industrially.

In general, a hollow-fiber membrane module comprises a vessel containing one or more bundles of many semipermeable membranes, each in a hollow fiber form having an outer diameter of up to several millimeters. Known examples of this type of module include modules of virus-removing membranes, micro- or ultrafiltration membranes, gas separation membranes, artificial kidney hollow-fiber membranes, etc. In the present invention, an artificial kidney hollow-fiber membrane module is especially preferably used.

The term "artificial kidney hollow-fiber membrane module" used herein means a mass transfer device employing semipermeable membranes, in particular a hollow-fiber membrane type mass transfer device employing semipermeable membranes of hollow fiber form, which is generally used for artificial dialysis. The hollow-fiber membrane modules commercially available at present especially as artificial kidneys comprise a cylindrical shell containing many hollow-fiber membranes densely disposed therein.

Any desired module can be selected from such commercial artificial kidney modules and used in the present invention.

The present inventors have found that the industrial use of such a hollow-fiber membrane module has the following advantages.
a) The device is compact and ensures a large membrane area.
b) The device is an industrial product with a stable quality.
c) The device has a simple structure.
d) Since the holdup amount is small, there is little latex loss resulting from the treatment.

Especially in the case of using an artificial kidney hollow-fiber membrane module, there are the following advantages.
a) Because the membrane thickness is as small as from 5 to 40 μm, the rate of dialysis and removal is high.
b) Since the outer diameter of the hollow-fiber membranes is as small as about from 200 to 300 μm, the hollow-fiber membranes can be packed at a high density, whereby the device can be extremely compact and ensure a large membrane area.
c) Module replacement operation is very easy.
d) The holdup amount is extremely small and the latex loss is almost nil.
e) The device is industrially mass-produced, and it has stable quality and is very inexpensive.

The present inventors have further found that a hollow-fiber membrane module can be made to be more effectively used by specifying some conditions.

It is important in the present invention that in the treatment, the pressure on the latex side (PL) and the pressure on the dialyzing fluid side (PW) separated from the latex side by the membrane be kept so that PL≦PW. The pressures of the two sides are preferably regulated so that $0 \leq (PW-PL) \leq 10$ kg/cm$^2$, more preferably $0 \leq (PW-PL) \leq 1$ kg/cm$^2$. If the pressures are regulated so that PW<PL, latex particles are deposited on the membrane surface because latex filtration occurs, resulting in a decrease in treating ability and clogging within the module. On the other hand, if (PW−PL)>10 kg/cm$^2$, the rate of water penetration from the water side to the latex side is so high that the latex is excessively diluted, resulting in the necessity of a concentrating operation after the dialysis, or resulting in membrane breakage in some cases.

In the present invention, the latex and the dialyzing fluid may be passed in either a cocurrent or a countercurrent manner. However, cocurrent passing is preferred from the standpoint of pressure conditions.

It is preferred in the present invention that the latex be passed through the module on the outer side of the hollow-fiber membranes, while the dialyzing fluid be passed through the module on the inner side of the hollow-fiber membranes. In general, vinylidene chloride-based latexes being handled have a solid content of about 50% by weight. However, if a latex having such a high solid content is passed through the inside of hollow fibers, there is a fear that the hollow fibers may suffer clogging, etc. and become unusable.

Any desired flow rate of the latex can be selected in the present invention. Usually, however, the rate thereof is suitably selected from the range of from 0.1 to 500 cm/sec. If the linear velocity of the latex relative to the membrane surface is lower than 0.1 cm/sec, concentration polarization occurs to reduce the removal rate and cause deposition on the membrane surface, making it impossible to conduct stable treatment. On the other hand, if the linear velocity thereof exceeds 500 cm/sec, the latex particles have reduced stability due to shearing, etc., resulting in coagulation and deposition on the membranes.

In the present invention, it is preferred to use membranes having a water permeability as measured at 25° C. with pure water of 500 ml/Hr·m²·mmHg or lower. The membranes more preferably have a water permeability of 100 ml/Hr·m²·mmHg or lower. If the water permeability thereof exceeds the upper limit, the rate of water penetration to the latex side is so high that the solid concentration is reduced excessively, and this concentration decrease results in considerable industrial expense, such as necessitating a concentrating operation at a later step.

The membranes advantageously used in the present invention usually have a rejection limit of from 500 to 100,000 in terms of molecular weight. If the rejection limit thereof exceeds 100,000, there are cases where latex particles clog the membranes and leak.

In the present invention, the chlorine ion concentration in the latex should be reduced to or below 500 ppm, preferably 200 ppm of all solid matter in the latex. If the latex treated has a chlorine ion concentration higher than 500 ppm, the coating film formed by applying the latex on a substrate cannot have sufficient performance especially in boil blushing properties.

The treatment according to the present invention is usually carried out while regulating the temperatures of the latex and the dialyzing fluid in the range of from 5 to 50° C.

The dialyzing fluid used in the present invention is usually preferably a water. More preferred is a water having a lower content of water-soluble substances, such as ions and organic substances, and of solid matter. In general, soft water, deionized water, or the like is used.

The apparatus used in the present invention is not limited in type in any way. The apparatus may be one used for either batch or continuous treatment.

The present invention provides a vinylidene chloride-based latex for use in the field of food packaging using hot water treatment, especially for use in the coating of films of plastics such as nylons. The present invention also provides an extremely efficient and effective process for industrially producing the latex. In particular, the vinylidene chloride-based latex of the present invention, which is suitable for use in the field of food packaging where sterilization with hot water is necessary, and the process for producing the latex according to the present invention are of great significance.

DESCRIPTION OF SYMBOLS

A, latex container; B, artificial kidney hollow-fiber module; C, pressure control valve; D, pressure control valve; E, header; F, header; G, header; H, header; P, manometer.

BEST MODES FOR CARRYING OUT THE INVENTION

The present invention will be explained below in more detail by reference to Examples, etc., but the invention should not be construed as being limited by these Examples, etc. in any way. All parts and percents are by weight unless. otherwise indicated.

Analytical means and the like used in the Examples of the invention, etc. are as follows.

(a) Determination of Ion

A latex (LTX) was subjected to solid/liquid separation by centrifugal separation, and the aqueous phase obtained was analyzed by ion chromatography. Each value of ion content is based on the weight of all solid matter.

(b) Determination of Solid Content

About 1 g of a vinylidene chloride-based latex was placed on an aluminum foil plate which had been precisely weighed, and the plate and latex were then precisely weighed. The plate with the latex was placed for 30 minutes in a circulating hot-air dryer maintained at 120° C. The solid content of the latex was determined from the difference between the initial weight thereof and the weight thereof after drying.

(c) Production of Coating Film

A biaxially stretched nylon film which had undergone corona discharge treatment was coated with an anchor coat (Takelac A-310/Takenate A-3/ethyl acetate=12/2/93 by weight; manufactured by Takeda Chemical Industries, Ltd.) in an amount of 0.2 g/m², and the coating was dried. Subsequently, a vinylidene chloride-based latex was applied thereto with a mayer rod in such an amount as to result in a coating film weight of 5 g/m² on a dry basis, and the coating was dried in a circulating hot-air dryer at 120° C. for 10 seconds. The coated film was then aged at 40° C. for 2 days.

(d) Hot Water Treatment

The coated film was immersed in 95° C. hot water for 30 minutes and then sandwiched between filter papers to soak up water drops adherent to the coated film.

(e) Oxygen Permeability

The coated film produced in (c) above using a biaxially stretched nylon film (15 μm) was examined with OX-TRAN 100 (manufactured by Modern Control Inc.) at 20° C. and a relative humidity of 100%, after one-day standing at room temperature at a relative humidity of 100% or immediately after the hot water treatment. (In Table 3 given later, the results of the former are given under "Oxygen permeability", while those of the latter are given under "Oxygen permeability after boiling".) The amount of the coating was 5 g/m².

(f) Blushing of Coating Film

The coated film produced in (c) above using a biaxially stretched nylon film (15 μm) was heated for 1 second with a gradient-heating tester manufactured by Toyo Seiki Seisaku-Sho, Ltd. at temperatures of 160, 180, and 200° C. while applying a pressure of 1 kg/cm² (heat sealing). Immediately thereafter, a hot water treatment was conducted. After the hot water treatment, the heat-sealed areas were examined for the degree of blushing based on visual evaluation, and further for haze (%) with hazeometer NDH-1001DP, manufactured by Nippon Denshoku Kogyo K. K. (The results are given in Table 3 under "Boil blushing".) In this test method, the coated films having hazes not higher than about 5% show satisfactory transparency in visual examination, while those having hazes not lower than about 10% are obviously opaque and milky. From the results of this test, coated films were found to be satisfactory in practical use when the hazes thereof were not higher than 7%.

Syntheses of Latexes

SYNTHESIS EXAMPLE 1

A monomer premix was prepared from 90 parts of vinylidene chloride, 6 parts of methyl methacrylate, 3.5 parts of acrylonitrile, and 0.5 parts of acrylic acid (total: 100 parts). Ten percent of the monomer premix was added to an aqueous-phase premix which had been prepared from 90 parts of deionized water, 0.08 parts of sodium dodecylbenzenesulfonate, and 0.05 parts of sodium persulfate in a glass-lined pressure-resistant iron reactor. The reactor was sealed and the contents were maintained at 55° C. with stirring to allow polymerization to proceed. An aqueous solution of 0.65 parts of sodium lauryl sulfate was additionally added to the reaction mixture, and the remainder (i.e., 90%) of the monomer premix and a dilute aqueous solution of sodium persulfate were continuously added over a period of 15 hours, throughout which the reaction mixture was maintained at 55° C. and continuously stirred. Thus, the reaction was allowed to proceed until the internal pressure of the reactor became sufficiently low to thereby obtain a latex. Sodium lauryl sulfate was further added to the thus-obtained latex to adjust the surface tension thereof to 42 dyne/cm at 20° C. Thereafter, the monomers remaining unreacted were removed by steam stripping. The latex obtained had a sodium ion concentration of 700 ppm, a chlorine ion concentration of 900 ppm, and a solid concentration of 55% by weight. This latex is referred to as latex (a).

SYNTHESIS EXAMPLE 2

The same procedure as in Synthesis Example 1 was conducted, except that the monomer premix composition was changed to 90 parts of vinylidene chloride, 8 parts of methyl methacrylate, and 2 parts of 2-hydroxyethyl acrylate. The latex obtained had a sodium ion concentration of B70 ppm, a chlorine ion concentration of 780 ppm, and a solid concentration of 55% by weight. This latex is referred to as latex (b).

Apparatus Systems and Flow Diagrams

Apparatus system examples for carrying out the present invention for dialyzing vinylidene chloride-based latexes and flow diagrams therefor are explained below by reference to FIGS. 1 to 3. The following Examples and Comparative Examples were conducted using these system examples according to these flow diagrams. The corresponding flows are indicated by the numerals in parentheses.

Figure 1:
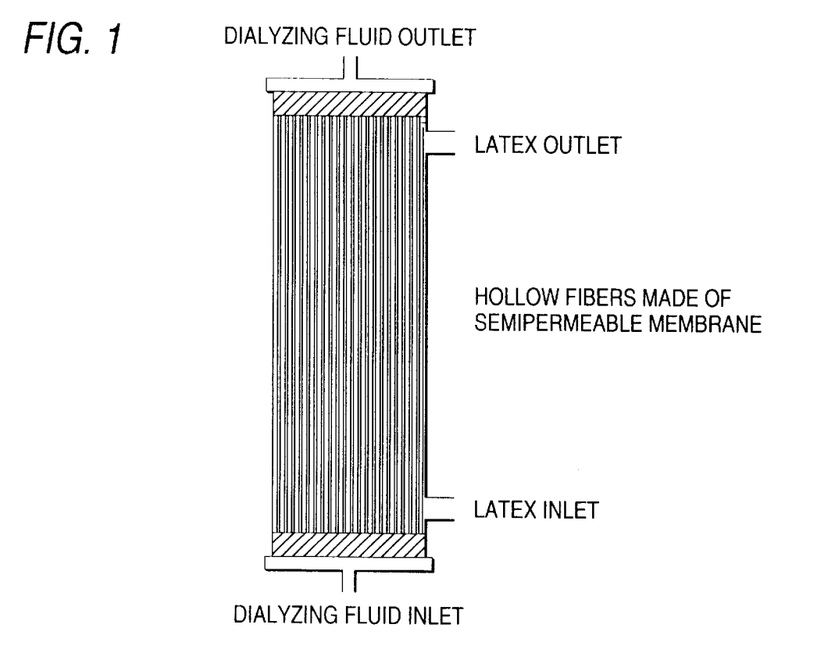
FIG. 1 is a longitudinal sectional view of an artificial kidney hollow-fiber membrane module as a hollow-fiber membrane module.

FIG. 1 is a sectional view of an artificial kidney hollow-fiber membrane module as a hollow-fiber membrane module. In the Examples, hollow-fiber membrane modules having an outer diameter of about 50 mm and a length of about 300 mm, which are commonly available commercially, were used mostly either alone or in combination of two or more thereof arranged in a row.

Batch Treatment with One Module

Figure 2:
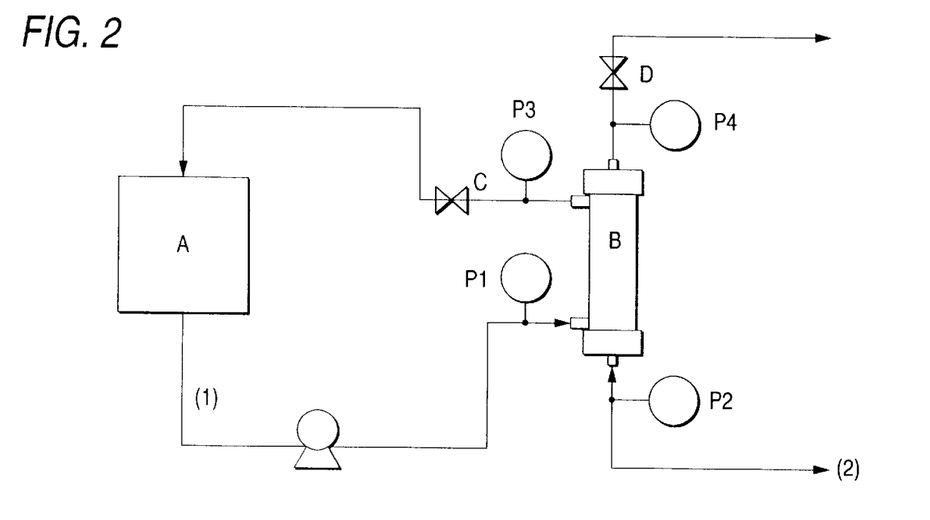
FIG. 2 is a view illustrating an apparatus for batch treatment with one module.

The apparatus is shown in FIG. 2. A latex (1) is fed from a latex container A and passed upward through a vertically installed artificial kidney hollow-fiber membrane module B on the outer side of the hollow-fiber membranes. On the other hand, a dialyzing fluid (2) is passed on the inner side of the hollow-fiber membranes. In the case where the dialyzing fluid and the latex are passed in a cocurrent manner, the dialyzing fluid (2) flows from a lower part to an upper part of the module. In the case of countercurrent treatment, the dialyzing fluid (2) flows from an upper part to a lower part of the module. The latex introduced into the module is drawn off through an upper part of the module and circulated to the container A. On the other hand, the dialyzing fluid is drawn off through an upper or lower part of the module and discharged from the system. The latex line and the dialyzing fluid line have manometers P1 and P2, respectively, disposed close to the inlets to the module, and have manometers P3 and P4, respectively, disposed close to the outlets from the module. The latex line and the dialyzing fluid line further have pressure control valves C and D, respectively, after the outlet side manometers. Basic pressure conditions include $P2 \geq P1$ and $P4 \geq P3$; these conditions are attained by controlling the flow rate of the dialyzing fluid and/or the degree of opening of the valves C and D.

Batch Treatment with Modules Arranged in a Row

Figure 3:
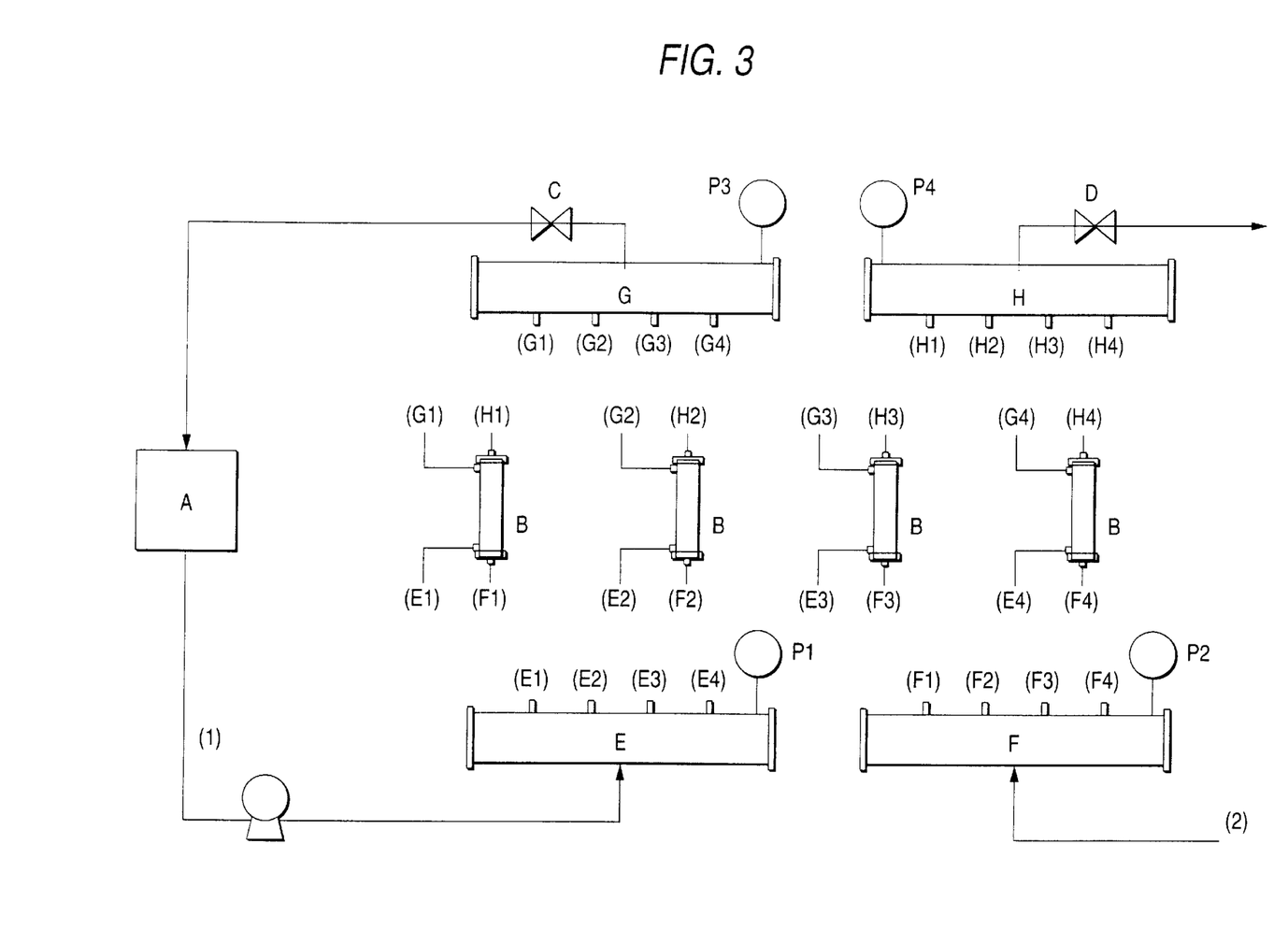
FIG. 3 is a view illustrating an apparatus for batch treatment with modules arranged in a row.

FIG. 3 is a view illustrating an apparatus employing four modules arranged in a row. In the apparatus, a plural number of modules B have been attached to headers E, F, G, and H having an inner diameter of 68 mm and a length of 1,450 mm.

A latex (1) is fed from a latex container A with a pump to the modules B through the underlying header E, and is passed through the modules B on the outer side of the hollow-fiber membranes. A dialyzing fluid (2) is fed to the modules and passed therethrough on the inner side of the hollow-fiber membranes. In the case where the dialyzing fluid and the latex are passed in a cocurrent manner, the dialyzing fluid (2) is fed via the header F. In the case of countercurrent treatment, the dialyzing fluid (2) is fed via the header H. The latex introduced into the modules is drawn off through upper parts of the modules and circulated to the container A via the header G. On the other hand, the dialyzing fluid is drawn off through upper or lower parts of the modules and discharged from the system via the Header H or F. The latex line and the dialyzing fluid line have manometers P1 and P2, respectively, disposed around the inlets to the modules, and have manometers P3 and P4, respectively, disposed around the outlets from the modules. The latex line and the dialyzing fluid line further have pressure control valves C and D, respectively, after the outlet side manometers. Basic pressure conditions include $P2 \geq P1$ and $P4 \geq P3$; these conditions are attained by controlling the flow rate of the dialyzing fluid and/or the degree of opening of the valves C and D.

Continuous Treatment

Figure 4:
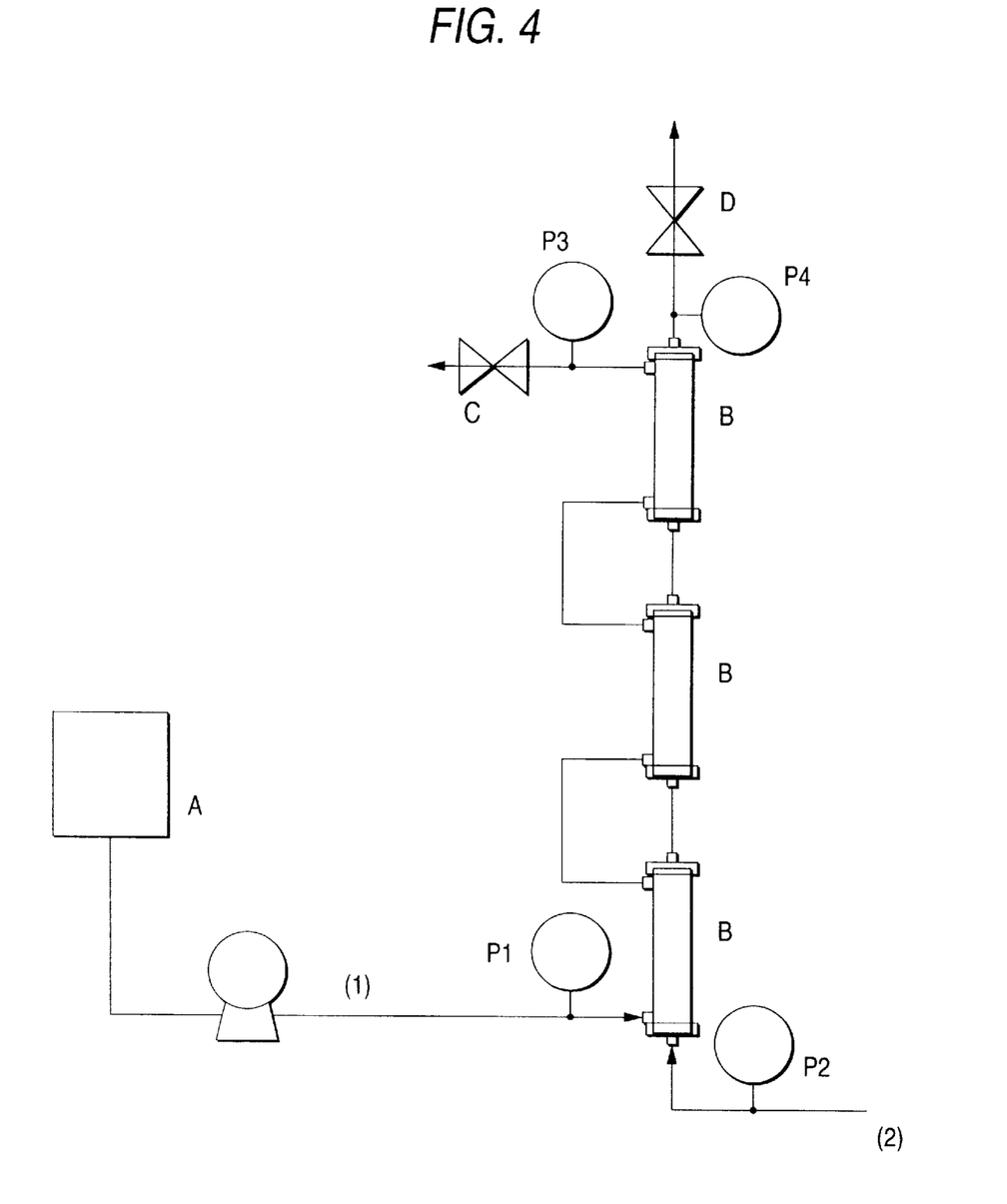
FIG. 4 is a view illustrating an apparatus for continuous treatment with modules arranged in series.

FIG. 4 is a view illustrating an apparatus employing three modules arranged in series. A latex (1) is fed from a latex container A to the artificial kidney hollow-fiber membrane modules B arranged in series, and passed therethrough on the outer side of the hollow-fiber membranes. On the other hand, a dialyzing fluid (2) is passed through the modules on the inner side of the hollow-fiber membranes. The dialyzing fluid and the latex are passed in a cocurrent or countercurrent manner. The latex and dialyzing fluid introduced into the modules are drawn off the modules and discharged from the system. The latex line and the dialyzing fluid line have manometers P1 and P2, respectively, disposed close to the inlets to the modules, and have manometers P3 and P4, respectively, disposed around the outlets from the modules. The latex line and the dialyzing fluid line further have pressure control valves C and D, respectively, after the outlet side manometers. Basic pressure conditions include $P2 \geq P1$ and $P4 \geq P3$; these conditions are attained by controlling the flow rate of the dialyzing fluid and/or the degree of opening of the valves C and D.

Details of the experimental conditions used in the following Examples and Comparative Examples are summarized in Tables 1 and 2.

With respect to the solid content of a latex, the dialysis treatments which resulted in a solid content decrease of 10% by weight or smaller are indicated by "o", and those which resulted in a solid content decrease exceeding 10% by weight are indicated by "x".

EXAMPLE 1

Latex (a), produced in Synthesis Example 1, in an amount of 25 kg (about 20 L (liters)) was treated using soft water as a dialyzing fluid and an artificial kidney module manufactured by Asahi Medical Co., Ltd. (regenerated cellulose; water permeability, 5 mL/Hr·m²·mmHg; membrane area, 2.1 m²; wet membrane thickness, about 30 μm; rejection limit molecular weight, about 10,000) as a hollow-fiber membrane module. This module had a cross section in which the total sectional area of the inside of the hollow-fiber membranes was about 5 cm² and that of the outside of the hollow-fiber membranes was about 7 cm².

Using the apparatus system shown in FIG. 1, the latex was continuously fed to the module and then circulated again, while soft water was continuously fed to the module and then discharged from the system. Thus, the latex was dialyzed.

The temperature of the latex and soft water was regulated to 25° C. The latex and the soft water were passed in a cocurrent manner on the outer side of the hollow-fiber membranes and on the inner side thereof, respectively. The dialysis was conducted under the conditions of a latex flow rate of 4 L/min (linear velocity relative to the membrane surface, about 9.5 cm/sec) and a pressure difference between the dialyzing fluid side and the latex side (PW–PL) of 0 kg/cm² (latex side inlet pressure, 0.9 kg/cm²–G (gauge pressure); latex side outlet pressure, 0.1 kg/cm²–G; soft-water flow rate, 2.8 L/min; soft-water side inlet pressure 0.9 kg/cm²–G; soft-water side outlet pressure, 0.1 kg/cm²–G). The dialysis was conducted for 1 hour while sampling the latex at an interval of 10 minutes. The latex was examined for latex properties, i.e., ion content and solid content, and for coating-film properties, i.e., oxygen permeability before and after hot water treatment, and boil blushing. The results obtained are shown in Table 3.

EXAMPLE 2

Using the same apparatus and module as in Example 1, dialysis was conducted under the same conditions as in Example 1, except that the latex was replaced with latex (b), produced in Synthesis Example 2. The results obtained are shown in Table 3.

COMPARATIVE EXAMPLE 1

The same latex as in Example 1 was used and dialysis treatment was carried out as follows.

In a regenerated-cellulose tube having a diameter of 76 mm and a membrane area of 0.05 m² (manufactured by Viskase Inc.; water permeability, 5 ml/Hr·m²·mmHg; wet membrane thickness, 140 μm; rejection limit molecular weight, about 10,000) was placed 0.6 kg of the latex. This tube was immersed in running water to conduct dialysis. In this dialysis, the amount of the latex per unit membrane area was the same as in Example 1.

The dialysis was continuously performed for 4 hours. As a result, the chlorine ion content was reduced to 650 ppm, showing that this dialysis had a far lower efficiency than the dialysis in Example 1. The results obtained are shown in Table 3.

COMPARATIVE EXAMPLE 2

Using the same apparatus, module, and latex as in Example 1, dialysis was conducted under the same conditions as in Example 1, except that those parts in the module through which the latex and the dialyzing fluid were passed were changed and the flow rates of these were changed as follows.

In Comparative Example 2, the latex was passed on the inner side of the hollow-fiber membranes, and soft water was passed on the outer side of the hollow-fiber membranes. Details of the conditions are shown in Table 1.

The pressure loss within the hollow-fiber membranes began to increase after the initiation of latex passing, and the membranes were completely clogged in 5 minutes. The results obtained are shown in Table 3.

REFERENCE EXAMPLES 1 AND 2

The salt-containing latexes as specified below were prepared from 1 kg of the latex which had undergone the 60-minute treatment in Example 1. The salt-containing latexes and coating films obtained therefrom were examined for properties in the same manner as in Example 1. The latex used had a solid content of 53% by weight and such an inorganic-salt content that [Na⁺]=120 ppm, [Cl⁻]=80 ppm, and a total salt content of 200 ppm.

In Reference Example 1, 0.526 g (about 9 mmol) of sodium chloride was added. As a result, the latex came to have a chlorine ion content of 681 ppm and a total inorganic-salt content of 1,192 ppm.

In Reference Example 2, 1.28 g (about 9 mmol) of sodium sulfate was added. This addition resulted in a total inorganic-salt content of 2,615 ppm.

Only the latex obtained in Reference Example 1 gave unsatisfactory results regarding coating film properties (oxygen permeability after boiling and boil blushing) like the latex prior to dialysis. The results obtained are shown in Table 3.

EXAMPLES 3 TO 8

Using the same apparatus and module as in Example 1, 1,250 kg of the latex produced in Synthesis Example 1 was dialyzed until the chlorine ion content in the latex was reduced to or below 200.ppm under the same conditions as in Example 1, except that the pressure conditions for the dialyzing fluid side and the latex side (PW–PL) were changed as shown in Table 1.

By regulating the water side pressure to values slightly higher than that of the latex side pressure, the dialysis efficiency was heightened. The periods required for the dialysis treatments and the results regarding the solid content decreases for the latex through the treatments are shown in Table 4.

EXAMPLES 9 TO 11

Using the same apparatus, module, and latex as in Example 3, dialysis was conducted until the chlorine ion content in the latex was reduced to or below 200 ppm under the same conditions as in Example 3, except that the flow rates of the latex and dialyzing fluid and the pressure conditions therefor (PW–PL) were changed as shown in Table 2. The periods required for the dialysis treatments and the results regarding the solid content decreases for the latex through the treatments are shown in Table 4.

EXAMPLE 12

Using the same apparatus, module, and latex as in Example 3, dialysis was conducted until the chlorine ion content in the latex was reduced to or below 200 ppm under the same conditions as in Example 3, except that the passing directions and flow rates of the latex and dialyzing fluid and the pressure conditions therefor (PW–PL) were changed as shown in Table 2. The period required for the dialysis treatment and the results regarding the solid content decrease for the latex through the treatment are shown in Table 4.

COMPARATIVE EXAMPLE 3

Using the same apparatus, module, and latex as in Example 3, dialysis was conducted under the same conditions as in Example 3, except that the pressure conditions (PW–PL) were changed as shown in Table 2.

Under those conditions, in which the latex side pressure was higher than the dialyzing fluid side pressure, latex filtration occurred. As a result, the dialysis efficiency was low. In addition, the pressure loss within the module increased with the lapse of time, and the inside of the module was clogged in 20 hours, making it impossible to continue the treatment. The latex recovered at the time of this clogging had a chlorine ion content of 600 ppm. The results obtained are shown in Table 4.

COMPARATIVE EXAMPLE 4

Using the same apparatus, module, and latex as in Example 3, dialysis was conducted under the same conditions as in Example 3, except that the passing directions for the latex and dialyzing fluid and the pressure conditions therefor (PW–PL) were changed as shown in Table 2.

Under those conditions, in which the latex side pressure was higher than the dialyzing fluid side pressure on the dialyzing fluid outlet side, latex filtration occurred. As a result, the pressure loss within the module increased with the lapse of time, and the inside of the module was clogged in 10 hours, making it impossible to continue the treatment. The latex recovered at the time of this clogging had a chlorine ion content of 550 ppm. The results obtained are shown in Table 4.

EXAMPLES 13 TO 15

Using the same apparatus and latex as in Example 3, dialysis was conducted until the chlorine ion content in the latex was reduced to or below 200 ppm under the same conditions as in Example 3, except that the hollow-fiber membrane module and the pressure conditions (PW–PL) were changed as follows. Details of the conditions are shown in Table 2.

In Example 13, an artificial kidney module employing regenerated-cellulose hollow fibers having a water permeability of 25 ml/Hr·m$^2$·mmHg (membrane area, 2.0 m$^2$; membrane thickness, 30 μm; rejection limit molecular weight, about 10,000) was used. This module had a cross section in which the sectional area of the inside of the hollow-fiber membranes was about 5 cm$^2$ and that of the outside of the hollow-fiber membranes was about 7 cm$^2$.

In Example 14, an artificial kidney module employing polyacrylonitrile hollow fibers having a water permeability of 200 ml/Hr·m$^2$·mmHg (membrane area, 2.2 m$^2$; membrane thickness, 35 μm; rejection limit molecular weight, about 50,000) was used. This module had a cross section in which the sectional area of the inside of the hollow-fiber membranes was about 7 cm$^2$ and that of the outside of the hollow-fiber membranes was about 12 cm$^2$.

In Example 15, an artificial kidney module employing polysulfone hollow fibers having a water permeability of 200 ml/Hr·m$^2$·mmHg (membrane area, 1.6 m$^2$; membrane thickness, 35 μm; rejection limit molecular weight, about 50,000) was used. This module had a cross section in which the sectional area of the inside of the hollow-fiber membranes was about 5 cm$^2$ and that of the outside of the hollow-fiber membranes was about 7 cm$^2$. The periods required for the dialysis treatments and the results regarding the solid content decreases for the latex through the treatments are shown in Table 5.

COMPARATIVE EXAMPLE 5

Using the same apparatus and latex as in Example 13, dialysis was conducted under the same conditions as in Example 10, except that the hollow-fiber membrane module, the pressure conditions (PW–PL), and the latex amount were changed as follows. Details of the conditions are shown in Table 2.

In Comparative Example 5, a microfiltration module employing polyethylene hollow-fiber membranes having a water permeability of 1,000 ml/Hr·m$^2$·mmHg (membrane area, 2.9 m$^2$; membrane thickness, 600 μm; rejection limit molecular weight, 100,000 or higher) was used. This module had a cross section in which the sectional area of the inside of the hollow-fiber membranes was about 12 cm$^2$ and that of the outside of the hollow-fiber membranes was about 30 cm$^2$.

The dialysis efficiency was so low that the treatment required a long time. Moreover, the treatment caused a considerable decrease in solid content. The results obtained are shown in Table 5.

EXAMPLES 16 AND 17

The same latex as in Example 3 was dialyzed until the chlorine ion content in the latex was reduced to or below 200 ppm under the same conditions as in Example 3, except that an apparatus was used which included headers and four modules attached thereto in a row, and that the modules were as specified below. Details of the conditions are shown in Table 2.

In Example 16 were used the same artificial kidney modules of regenerated-cellulose hollow-fiber membranes as in Example 1.

In Example 17 were used the same artificial kidney modules of polyacrylonitrile hollow-fiber membranes as in Example 14. The periods required for the dialysis treatments and the results regarding the solid content decreases for the latex through the treatments are shown in Table 6.

EXAMPLE 18

Using the same modules and latex as in Example 3, dialysis was conducted under the same conditions as in Example 3, except that the apparatus shown in FIG. 4, including three modules arranged in series, was used, and that the dialysis operation, the amount of the latex treated, the flow rates of the latex and dialyzing fluid, and pressure conditions were changed as follows. Details of the conditions are shown in Table 2.

In Example 18, the latex was continuously fed to the modules and then drawn off without being circulated again. The latex obtained had a chlorine ion content of about 200 ppm. The results obtained are shown in Table 6.

TABLE 1

Details of Experimental Conditions

| | Module | Dialysis membrane | Water permeability | Membrane area m² | Treated LTX amount kg | Side of hollow fiber membrane Outer | Side of hollow fiber membrane Inner | Flow direction | Flow rate LTX | Flow rate Water | Linear LTX velocity | LTX side pressure (PL) inlet | LTX side pressure (PL) outlet | Water side pressure (PW) inlet | Water side pressure (PW) outlet | Pressure difference (PW − PL) inlet | Pressure difference (PW − PL) outlet |
|---|---|---|---|---|---|---|---|---|---|---|---|---|---|---|---|---|---|
| Ex. 1 | hollow-fiber membrane | cellulose | 5 | 2.1 | 25 | LTX | water | cocurrent | 4.0 | 2.8 | 9 | 0.9 | 0.1 | 0.9 | 0.1 | 0 | 0 |
| Ex. 2 | hollow-fiber membrane | cellulose | 5 | 2.1 | 25 | LTX | water | cocurrent | 4.0 | 2.8 | 9 | 0.9 | 0.1 | 0.9 | 0.1 | 0 | 0 |
| Comp. Ex. 1 | tube | cellulose | 5 | 0.05 | 0.6 | | | | dialysis with tube in running water | | | | | | | | |
| Comp. Ex. 2 | hollow-fiber membrane | cellulose | 5 | 2.1 | 25 | water | LTX | cocurrent | 1.0 | 1.0 | 3 | 0.6 | 0.1 | 0.6 | 0.1 | 0 | 0 |
| Ex. 3 | hollow-fiber membrane | cellulose | 5 | 2.1 | 1250 | LTX | water | cocurrent | 4.0 | 2.8 | 9 | 0.9 | 0.1 | 0.9 | 0.1 | 0 | 0 |
| Ex. 4 | hollow-fiber membrane | cellulose | 5 | 2.1 | 1250 | LTX | water | cocurrent | 4.0 | 2.8 | 9 | 0.9 | 0.1 | 1.0 | 0.2 | 0.1 | 0.1 |
| Ex. 5 | hollow-fiber membrane | cellulose | 5 | 2.1 | 1250 | LTX | water | cocurrent | 4.0 | 2.8 | 9 | 0.9 | 0.1 | 1.1 | 0.3 | 0.2 | 0.2 |
| Ex. 6 | hollow-fiber membrane | cellulose | 5 | 2.1 | 1250 | LTX | water | cocurrent | 4.0 | 2.8 | 9 | 0.9 | 0.1 | 1.3 | 0.5 | 0.4 | 0.4 |
| Ex. 7 | hollow-fiber membrane | cellulose | 5 | 2.1 | 1250 | LTX | water | cocurrent | 4.0 | 2.8 | 9 | 0.9 | 0.1 | 1.5 | 0.7 | 0.6 | 0.6 |
| Ex. 8 | hollow-fiber membrane | cellulose | 5 | 2.1 | 1250 | LTX | water | cocurrent | 4.0 | 2.8 | 9 | 0.9 | 0.1 | 1.9 | 1.1 | 1.0 | 1.0 |

Note) Water permeability: mL/Hr · m² · mmHg; flow rate: L/min; linear LTX velocity: cm/sec; LTX side pressure, water side pressure: kg/cm²-G; pressure difference: kg/cm²

TABLE 2

Details of Experimental Conditions

| | | | | | Side of hollow fiber membrane | | | Fluid Passing Conditions | | | LTX side pressure (PL) | | Water side pressure (PW) | | Pressure difference (PW − PL) | |
|---|---|---|---|---|---|---|---|---|---|---|---|---|---|---|---|---|
| | | Dialysis membrane | Water permeability | Membrane area | Treated LTX amount | | | Flow direction | Flow rate | | Linear LTX velocity | | | | | | |
| Module | | | | m² | kg | Outer | Inner | | LTX | Water | | inlet | outlet | inlet | outlet | inlet | outlet |
| Ex. 9 | hollow-fiber membrane | cellulose | 5 | 2.1 | 1250 | LTX | water | cocurrent | 0.8 | 4.3 | 19 | 1.8 | 0.15 | 2.0 | 0.35 | 0.2 | 0.2 |
| Ex. 10 | hollow-fiber membrane | cellulose | 5 | 2.1 | 1250 | LTX | water | cocurrent | 6.0 | 4.0 | 14 | 1.3 | 0.1 | 1.5 | 0.3 | 0.2 | 0.2 |
| Ex. 11 | hollow-fiber membrane | cellulose | 5 | 2.1 | 1250 | LTX | water | cocurrent | 2.0 | 1.5 | 5 | 0.5 | 0.1 | 0.7 | 0.3 | 0.2 | 0.2 |
| Ex. 12 | hollow-fiber membrane | cellulose | 5 | 2.1 | 1250 | LTX | water | counter-current | 1.0 | 0.5 | 2 | 0.5 | 0.05 | 0.95 | 0.6 | 0.9 | 0.1 |
| Comp. Ex. 3 | hollow-fiber membrane | cellulose | 5 | 2.1 | 1250 | LTX | water | cocurrent | 4.0 | 2.8 | 9 | 1.3 | 0.5 | 0.9 | 0.1 | −0.4 | −0.4 |
| Comp. Ex. 4 | hollow-fiber membrane | cellulose | 5 | 2.1 | 1250 | LTX | water | counter-current | 2.0 | 2.0 | 5 | 1.0 | 0.1 | 1.0 | 0.1 | 0.9 | −0.9 |
| Ex. 13 | hollow-fiber membrane | cellulose | 25 | 2.0 | 1250 | LTX | water | cocurrent | 4.0 | 2.8 | 9 | 0.9 | 0.1 | 1.0 | 0.2 | 0.1 | 0.1 |
| Ex. 14 | hollow-fiber membrane | polyacrylonitrile | 200 | 2.2 | 1250 | LTX | water | cocurrent | 5.0 | 3.1 | 7 | 0.9 | 0.1 | 0.9 | 0.1 | 0 | 0 |
| Ex. 15 | hollow-fiber membrane | polysulfone | 200 | 1.6 | 1250 | LTX | water | cocurrent | 4.0 | 2.8 | 9 | 0.9 | 0.1 | 0.9 | 0.1 | 0 | 0 |
| Comp. Ex. 5 | hollow-fiber membrane | polyethylene | 1000 | 2.9 | 1250 | LTX | water | cocurrent | 11.0 | 5.0 | 6 | 0.9 | 0.15 | 0.9 | 0.15 | 0 | 0 |
| Ex. 16 | hollow-fiber membrane | cellulose, 4 modules arranged in a row | 5 | 10.5 | 1250 | LTX | water | cocurrent | 20.0 | 12.0 | 12 | 0.9 | 0.1 | 1.1 | 0.3 | 0.2 | 0.2 |
| Ex. 17 | hollow-fiber membrane | polyacrylonitrile 4 modules arranged in a row | 200 | 11.0 | 1250 | LTX | water | cocurrent | 22.0 | 14.0 | 8 | 0.9 | 0.1 | 0.9 | 0.1 | 0 | 0 |
| Ex. 18 | hollow-fiber membrane | cellulose 3 modu- | 5 | 6.3 | 125 | LTX | water | cocurrent | 0.5 | 0.3 | 1 | 1.0 | 0.0 | 1.2 | 0.2 | 0.2 | 0.2 |

TABLE 2-continued

Details of Experimental Conditions

| | | | | | Fluid Passing Conditions | | | | | | | | | |
|---|---|---|---|---|---|---|---|---|---|---|---|---|---|---|
| Module | Dialysis membrane | Water permeability | Membrane area m² | Treated LTX amount kg | Side of hollow fiber membrane | | Flow direction | Flow rate | | Linear LTX velocity | LTX side pressure (PL) | | Water side pressure (PW) | | Pressure difference (PW − PL) | |
| | | | | | Outer | Inner | | LTX | Water | | inlet | outlet | inlet | outlet | inlet | outlet |
| | les arranged in a row | | | | | | | | | | | | | | | |

Note) Water permeability: mL/Hr · m² · mmHg; flow rate: L/min; linear LTX velocity: cm/sec; LTX side pressure, water side pressure: kg/cm²-G; pressure difference: kg/cm²

TABLE 3

| | Fluid passing conditions | | | | | | Solid | | | Boil blushing | | | |
|---|---|---|---|---|---|---|---|---|---|---|---|---|---|
| | Side of hollow-fiber membrane | | | Flow rate | | Pressure | dialysis | Cl- | content after treatment | Oxygen permeability | Oxygen permeability after boiling | Heat sealing temperature (° C.) | | | Visual evaluation |
| Dialysis membrane | Outer | Inner | Flow direction | LTX | Water | difference PW − PL | period min | content ppm | wt % | | | 160 | 180 | 200 | |
| Synthesis Ex. 1 | (emulsion polymerization) VDC/MMA/AN/AA = 90/6/3.5/0.5 | | | | | | — | 900 | — | 4 | 9 | 9 | 9 | 10 | poor |
| Ex. 1 | cellulose | LTX | water | cocurrent | 4.0 | 2.8 | 0 | 10 | 495 | ○ | 4 | 5 | 4 | 4 | 4 | good |
| | cellulose | LTX | water | cocurrent | 4.0 | 2.8 | 0 | 20 | 320 | ○ | 4 | 5 | 3 | 3 | 3 | good |
| | cellulose | LTX | water | cocurrent | 4.0 | 2.8 | 0 | 30 | 190 | ○ | 4 | 5 | 2 | 2 | 2 | good |
| | cellulose | LTX | water | cocurrent | 4.0 | 2.8 | 0 | 60 | 80 | ○ | 4 | 4 | 2 | 2 | 2 | good |
| Synthesis Ex. 2 | (emulsion polymerization) VDC/MA/2HEA = 90/8/2 | | | | | | — | 780 | — | 5 | 9 | 9 | 9 | 10 | poor |
| Ex. 2 | cellulose | LTX | water | cocurrent | 4.0 | 2.8 | 0 | 10 | 470 | ○ | 4 | 6 | 3 | 3 | 4 | good |
| | cellulose | LTX | water | cocurrent | 4.0 | 2.8 | 0 | 20 | 310 | ○ | 4 | 5 | 3 | 3 | 3 | good |
| | cellulose | LTX | water | cocurrent | 4.0 | 2.8 | 0 | 30 | 185 | ○ | 4 | 4 | 2 | 2 | 2 | good |
| | cellulose | LTX | water | cocurrent | 4.0 | 2.8 | 0 | 60 | 75 | ○ | 4 | 4 | 2 | 2 | 2 | good |
| Comp. Ex. 1 | cellulose | flat membrane tube | | | | | 0 | 4 Hr | 650 | ○ | 4 | 9 | 8 | 8 | 9 | poor |
| Comp. Ex. 2 | cellulose | water | LTX | cocurrent | 1.0 | 1.0 | 0 | 5 | 790 | ○ | 4 | 9 | 9 | 9 | 10 | poor |
| Reference Ex. 1 | NaCl was added to dialyzed latex | | | | | | — | 681 | ○ | 4 | 9 | 8 | 8 | 9 | poor |
| Reference Ex. 2 | Na₂SO₄ was added to dialyzed latex | | | | | | — | 80 | ○ | 4 | 4 | 2 | 2 | 2 | good | note) VDC: vinylidene chloride; MMA: methyl methacrylate; AN: acrylonitrile; AA: acrylic acid; 2HEA: 2-hydroxyethyl acrylate; flow rate: L/min; pressure difference: kg/cm²; oxygen permeability, oxygen permeability after boiling: cc/m² · atm · 24 hr

TABLE 4

|  | Dialysis membrane | Side of hollow-fiber membrane | | Flow direction | Flow rate | | Pressure difference | Dialysis period | Solid content after treatment | Remarks |
|---|---|---|---|---|---|---|---|---|---|---|
|  |  | Outer | Inner |  | LIX | Water | PW − PL kg/cm² | Hr | wt % |  |
| Ex. 3 | cellulose | LIX | water | cocurrent | 4.0 | 3.0 | 0 | 56 | ○ | improved efficiency was obtained because PW>PL |
| Ex. 4 | cellulose | LIX | water | cocurrent | 4.0 | 3.0 | 0.1 | 38 | ○ | improved efficiency was obtained because PW>PL |
| Ex. 5 | cellulose | LIX | water | cocurrent | 4.0 | 3.0 | 0.2 | 35 | ○ | improved efficiency was obtained because PW>PL |
| Ex. 6 | cellulose | LIX | water | cocurrent | 4.0 | 3.0 | 0.4 | 33 | ○ | improved efficiency was obtained because PW>PL |
| Ex. 7 | cellulose | LIX | water | cocurrent | 4.0 | 3.0 | 0.6 | 31 | ○ | improved efficiency was obtained because PW>PL |
| Ex. 8 | cellulose | LIX | water | cocurrent | 4.0 | 3.0 | 1.0 | 28 | ○ | improved efficiency was obtained because PW>PL |
| Ex. 9 | cellulose | LIX | water | cocurrent | 8.0 | 4.6 | 0.2 | 30 | ○ |  |
| Ex. 10 | cellulose | LIX | water | cocurrent | 6.0 | 4.0 | 0.2 | 30 | ○ |  |
| Ex. 11 | cellulose | LIX | water | cocurrent | 2.0 | 1.5 | 0.2 | 56 | ○ |  |
| Ex. 12 | cellulose | LIX | water | countercurrent | 1.0 | 0.5 | 0.9 (water inlet side) 0.1 (water outlet side) | 60 | ○ |  |
| Comp. Ex. 3 | cellulose | LIX | water | cocurrent | 4.0 | 3.0 | −0.4 | 20 | ○ | module clogged, further treatment was impossible |
| Comp. Ex. 4 | cellulose | LIX | water | countercurrent | 2.0 | 1.5 | 0.9 (water inlet side) −0.9 (water outlet side) | 10 | ○ | module clogged, further treatment was impossible |

Note) Flow rate: L/min

TABLE 5

| | Dialysis membrane | Side of hollow-fiber membrane | | Flow direction | Water permeability | Flow rate | | Pressure difference | Dialysis period | Solid content after treatment | Remarks |
|---|---|---|---|---|---|---|---|---|---|---|---|
| | | Outer | Inner | | | LTX | Water | PW − PL | Hr | wt % | |
| Ex. 13 | cellulose | LTX | water | cocurrent | 25 | 4.0 | 3.0 | 0.1 | 30 | ○ | |
| Ex. 14 | polyacrylonitrile | LTX | water | cocurrent | 200 | 5.0 | 3.3 | 0 | 28 | ○ | |
| Ex. 15 | polysulfone | LTX | water | cocurrent | 200 | 4.0 | 3.0 | 0 | 32 | ○ | |
| Comp. Ex. 5 | polyethylene | LTX | water | cocurrent | 1000 | 11.0 | 8.0 | 0 | 100 | X | low dialysis efficiency, large decrease in solid content |

Note) Water permeability: mL/Hr · m$^2$ · mmHg; flow rate: L/min; pressure difference: kg/cm$^2$

TABLE 5

| | Dialysis membrane | Side of hollow-fiber membrane | | Flow direction | Number of modules | Flow rate | | Pressure difference | Dialysis period | Solid content after treatment |
|---|---|---|---|---|---|---|---|---|---|---|
| | | Outer | Inner | | | LTX | Water | PW − PL | Hr | wt % |
| Ex. 16 | cellulose | LTX | water | cocurrent | 4 | 16 | 12 | 0.2 | 8 | ○ |
| Ex. 17 | polyacrylonitrile | LTX | water | cocurrent | 4 | 20 | 14 | 0 | 7 | ○ |
| Ex. 18 | cellulose | LTX | water | cocurrent | 3 | 0.5 | 0.3 | 0.2 | 3.3 | ○ |

Note) Flow rate: L/min; pressure difference: kg/cm$^2$

INDUSTRIAL APPLICABILITY

The present invention has the following advantages over prior art techniques.

1) A vinylidene chloride-based latex can be made to form a coating film excellent in hot-water resistance, especially resistance to boil blushing, and excellent in retention of gas barrier properties by regulating the latex so as to have a chlorine ion concentration not higher than 500 ppm based on the total concentration of all solid matter.
2) The dialysis method according to the present invention can be conducted efficiently and stably using a compact apparatus such as a hollow-fiber membrane module. In addition, the treatment can be carried out on the industrial scale at low cost.
3) A latex can be monitored for a property change during the long-term storage or transportation thereof based only on the chlorine ion content in the latex.

What is claimed is:

1. A latex composition comprising a copolymer of vinylidene chloride and at least one vinyl monomer copolymerizable with vinylidene chloride, which has a chlorine ion content not higher than 500 ppm based on the total concentration of all solid matter in the latex composition by weight.

2. The latex composition as claimed in claim 1, wherein the copolymer is produced by emulsion-polymerization from 86 to 94 wt % vinylidene chloride with at least one vinyl monomer copolymerizable with vinylidene chloride.

3. The latex composition as claimed in claim 1, wherein the copolymer contains from 0.1 to 4 wt % units derived from at least one monomer having a carboxyl group as the monomer copolymerizable with vinylidene chloride.

4. The latex composition as claimed in claim 1, wherein the copolymer contains from 0.1 to 6 wt % units derived from at least one monomer having a hydroxyl group as the monomer copolymerizable with vinylidene chloride.

5. A process for producing a latex composition, which comprises dialyzing a latex composition comprising a copolymer of vinylidene chloride and at least one vinyl monomer copolymerizable with vinylidene chloride to thereby reduce the chlorine ion content in the latex composition to or below 500 ppm of all solid matter in the latex composition by weight.

6. The process for producing a latex composition as claimed in claim 5, wherein at least one hollow-fiber membrane module is used for the dialysis.

7. The process for producing a latex composition as claimed in claim 6, wherein the hollow-fiber membrane module is a hollow-fiber membrane module for use as an artificial kidney.

8. The process for producing a latex composition as claimed in claim 7, wherein in the dialysis with at least one hollow-fiber membrane module for use as an artificial kidney, the latex side pressure PL and the dialyzing fluid side pressure PW are kept so that PL≦PW.

9. The process for producing a latex composition as claimed in claim 8, wherein the pressure difference ΔP between the latex side pressure PL and the dialyzing fluid side pressure PW, [i.e.,] ΔP=PW−PL, is regulated to 0≦ΔP≦10 kg/cm$^2$.

10. The process for producing a latex composition as claimed in claim 7, wherein in the dialysis with at least one hollow-fiber membrane module for use as an artificial kidney, the dialyzing fluid is passed through the module on the inner side of the hollow-fiber membranes and the latex composition is passed through the module on the outer side of the hollow-fiber membranes.

11. The process for producing a latex composition as claimed in claim 7, wherein in the dialysis with at least one hollow-fiber membrane module for use as an artificial kidney, the latex composition and the dialyzing fluid are passed in a cocurrent manner.

12. The process for producing a latex composition as claimed in claim 7, wherein in the dialysis with at least one hollow-fiber membrane module for use as an artificial kidney, the latex composition is passed at a linear velocity of from 0.1 to 500 cm/sec relative to the dialysis membrane surface.

13. The process for producing a latex composition as claimed in claim 7, wherein in the dialysis with at least one hollow-fiber membrane module, the latex composition side pressure PL and the dialyzing fluid side pressure PW are kept so that PL≦PW, the dialyzing fluid is passed through the module on the inner side of the hollow-fiber membranes and the latex composition is passed through the module on the outer side of the hollow-fiber membranes, the latex composition and the dialyzing fluid are passed in a cocurrent manner, and the latex composition is passed at a linear velocity of from 0.1 to 500 cm/sec relative to the dialysis membrane surface.

14. The process for producing a latex composition as claimed in claim 6, wherein the hollow-fiber membranes have a water permeability as measured with pure water of from 0.1 to 500 ml/mmHg·Hr·m$^2$.

15. The process for producing a latex composition as claimed in claim 14, wherein the hollow-fiber membranes are made of a cellulose material.

16. The process for producing a latex composition as claimed in claim 6, wherein the hollow-fiber membranes have a rejection limit in the range of from 500 to 100,000 in terms of the molecular weight of a standard protein.

17. The process for producing a latex composition as claimed in claim 7, wherein the hollow-fiber membranes have a water permeability of from 0.1 to 500 ml/mmHg·Hr·m$^2$ and a rejection limit in the range of from 500 to 100,000.

* * * * *